(12) United States Patent
Bouffard et al.

(10) Patent No.: US 6,892,842 B2
(45) Date of Patent: May 17, 2005

(54) AIR INTAKE FOR A STRADDLE-TYPE ALL TERRAIN VEHICLE

(75) Inventors: Eric Bouffard, Notre-Dame du Mont Carmel (CA); Mario Fortier, Ascot (CA); Ghislain Caron, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 167 days.

(21) Appl. No.: 09/942,673

(22) Filed: Aug. 31, 2001

(65) Prior Publication Data

US 2002/0023792 A1 Feb. 28, 2002

Related U.S. Application Data

(60) Provisional application No. 60/229,027, filed on Aug. 31, 2000.

(51) Int. Cl.$^7$ .............................................. B60K 13/02
(52) U.S. Cl. .................................................... 180/68.3
(58) Field of Search .............................. 180/210, 211, 180/215, 68.3, 68.1, 908, 311, 312, 291, 292; 123/198 E; 293/117

(56) References Cited

U.S. PATENT DOCUMENTS

| | | | | |
|---|---|---|---|---|
| 3,700,259 A | * | 10/1972 | Scheinkoenig | |
| 3,796,277 A | * | 3/1974 | Gordon | 180/68.3 |
| 4,357,893 A | * | 11/1982 | Frye | |
| 4,475,616 A | * | 10/1984 | Yamazaki et al. | 180/215 |
| 4,577,720 A | * | 3/1986 | Hamane et al. | 180/229 |
| 5,086,858 A | * | 2/1992 | Mizuta et al. | 180/68.3 |
| 5,327,989 A | * | 7/1994 | Furuhashi et al. | 180/248 |
| 5,947,219 A | * | 9/1999 | Peter et al. | 180/68.1 |
| 6,170,597 B1 | * | 1/2001 | Fukuda | 180/292 |
| 6,206,446 B1 | * | 3/2001 | Slayden | 296/77.1 |
| 6,243,928 B1 | * | 6/2001 | Powell | |
| 6,490,907 B2 | * | 12/2002 | Dobbins et al. | 293/117 X |
| 6,523,634 B1 | * | 2/2003 | Gagnon et al. | 180/291 |
| 6,626,260 B2 | * | 9/2003 | Gagnon et al. | 180/291 |
| 2002/0088661 A1 | * | 7/2002 | Gagnon et al. | |

FOREIGN PATENT DOCUMENTS

| | | | |
|---|---|---|---|
| JP | 58-33522 | * | 2/1983 |
| JP | 59-48270 | * | 3/1984 |
| JP | 59-155545 | * | 9/1984 |
| JP | 60-153418 | * | 8/1985 |
| JP | 61-146633 | * | 7/1986 |
| JP | 61-171610 | * | 8/1986 |
| JP | 61-200029 | * | 9/1986 |
| JP | 62-6826 | * | 1/1987 |
| JP | 62-105719 | * | 5/1987 |
| JP | 431189 | * | 2/1989 |
| JP | 1301484 | * | 12/1989 |
| JP | 3123482 | * | 9/1991 |
| JP | 5147565 | * | 6/1993 |

\* cited by examiner

*Primary Examiner*—Bryan Fischmann
(74) *Attorney, Agent, or Firm*—BRP Legal Services

(57) ABSTRACT

An all terrain or straddle type vehicle is provided with an air intake system having an air intake pipe with reduced length thereby avoiding unnecessary vibration which may adversely affect the fuel-to-air ratio of the engine, thereby improving engine performance. Also an inlet end of the air intake pipe is positioned so that the vehicle's capability for traversing water of a predetermined depth is improved. The height of the inlet end of the intake pipe is greater than the predetermined depth of the water to protect against water entering the air intake pipe due to encountering a water wave created in front of the vehicle that has a depth greater than the predetermined depth of the water. Additionally, openings in rear fenders of the vehicle channel intake air to both a radiator/fan assembly and the air intake system.

10 Claims, 15 Drawing Sheets

AIR INTAKE FOR A STRADDLE-TYPE ALL TERRAIN VEHICLE

CROSS REFERENCE TO RELATED APPLICATIONS

This application claims priority to U.S. Provisional Patent Application Ser. No. 60/229,027 filed on Aug. 31, 2000, the entirety of which is hereby incorporated into the present application by reference thereto.

BACKGROUND OF THE INVENTION

1. Field of the Invention

This invention relates to an improved straddle type all terrain vehicle (ATV) and more particularly to the structure, placement and orientation of an air intake within the ATV.

2. Description of Related Art

FIG. 1A shows a related art ATV 700 including a frame 702, a pair of front wheels 704, and a pair of rear wheels 706. The frame 702 has mounted thereto a body 708, which is shown to include front facie 710 and rear fenders 712. Additionally, the ATV 700 includes a fuel tank 714 mounted thereto.

For the ATV 700 shown in FIG. 1A, the rear wheels 706 are supplied power from an engine 718. The engine 718 generates power by combusting a mixture of fuel and air. The fuel is delivered to the engine 718 from the fuel tank 714 by a suitable means, such as a fuel pump. Air is pulled from the atmosphere through an air intake system, indicated at 720, mixed with the fuel in a carburetor 743, and combusted within a chamber of the engine 718. An inlet 722 of air intake system 720 is positioned between the seat 710 and fuel tank 714. Accordingly, the inlet 722 is protected from debris and water entering therethrough.

FIG. 1B shows a schematic view of the air intake system 720 and engine 718. As shown, the air intake system 720 includes a pair of intake tubes 730, which on one end thereof provide the inlet 722, and are connected to a noise suppressing enclosure or silencer 732. The silencer 732 is a substantially voluminous enclosure, which serves to attenuate intake roar of the engine 718. The silencer 732 includes a hollow molded body 734 with an upwardly facing opening 736. A closure member (e.g., lid) 738 is detachably mounted (such as with clips 739) to the body 734 thereby sealing the opening 736. It is noted that the sealing of the opening 736 may be facilitated by a pliable sealing member 740 disposed between the body 734 and closure member 738. The silencer 732 is also connected to an intake duct 742, which is connected at an opposite end to the carburetor 743. As shown, an air filter 744 is disposed within the silencer 732 and may be connected to the end of duct 742 to filter or otherwise separate particulates through the air flowing from the air intake system 720 prior to delivery to the carburetor 743. As shown in FIG. 1A, the silencer 732 is positioned just behind the engine 718. The intake tubes 730 extend from the silencer 732, along an upper portion of the engine 718, to the position between the fuel tank 714 and the seat 710.

The main drawback of the air intake system 720 shown in FIGS. 1A and 1B, stems from the proximate positioning of the air intake 720 relative to the engine 718. In particular, the silencer 732 is positioned rearwardly of the engine 718 and adjacent thereto. Additionally, the intake tubes 730 are positioned above the engine 718, between the engine 718 and the seat 710, as is conventional. As such, the intake tubes 730 and silencer 732 are exposed to a substantial amount of heat generated by the engine 718, which serves to raise the temperature of intake air prior to combustion. Relatively high temperature intake air disadvantageously reduces engine efficiency and power output.

FIG. 2A is a perspective view showing a related prior art ATV 100 described in application Ser. No. 09/057,652 incorporated by reference into the provisional application No. 60/229,027 referenced above. The ATV 100 includes a pair of front wheels 102 and a pair of rear wheels 103. The front wheels 102 are covered by front fenders 117 and the rear wheels 103 are covered by rear fenders 116. A front rack 105 is provided above the front fenders 117 and the rack 106 is provided above the rear fenders 116. A pair of apertures or ventilation openings 120, provided in the rear fenders 116, supply intake air to a radiator and fan assembly 170 (FIG. 2B), which is generally beneath a seat 107. A pair of handle bars 110 is used to steer the ATV 100.

FIG. 2B is a top plan view of the ATV 100 shown in FIG. 2A, with the seat 107 being removed and the front and rear fenders 116, 117 being shown in phantom. The front and rear wheels 102 and 103 are supported by a main frame 121, while a subframe 122, which is connected to the main frame 121 through joints 124, supports the radiator and fan assembly 170. A suitable type of power unit, e.g., an engine 150, is preferably capable of simultaneously driving the front and rear wheels 102 and 103 through a suitable transmission, although rear wheel drive only ATVs are also contemplated. The ATV 100 also includes a carburetor 152, an exhaust pipe 154, a muffler 156, and an air intake system 200, which is shown in greater detail in FIG. 3.

FIG. 3 is a schematic view illustrating an intake air system 200. An inlet end 212 of a front air intake pipe 214 is positioned at the front of the ATV 100 adjacent the steering column, just below a mounting plate 115 for mounting equipment, e.g., an instrument panel and/or a dash board. The inlet end 212 is positioned at substantially the highest point of the ATV 100 to substantially eliminate entry of mud or water caused either by immersion when traversing relatively deep water or by splashing when traversing wet terrain. The front air intake pipe 214 is connected to a sleeve 216 and a rear air intake pipe 217 that leads to the air box 201, which is positioned just below a rear portion of the seat 107. Clamps 210 secure the front air intake pipe 214 to the sleeve 216, and the sleeve 216 to the rear air intake pipe 217. Intake air from the air box 201 is supplied to the carburetor 152 using a hose 206 that is held by a clamp 210 to the carburetor 152. Air is supplied to an engine valve cover (not shown) and the engine 150 using a vent hose 222, clamps 218 and 219, PCV valve 221, oetiker clamp 227, vent hose 226, "Y" fitting 228, hoses 229 and 230 and fitting 233. The air filter 155 is placed in the air box 201 along with a foam member 220. Air intake tubes 211 fit within the air filter 155. A cover 226 is secured by cover brackets 232 to the air intake box 201.

The related art air intake system 200 suffers from at least two main drawbacks. The first main drawback is that the cumulative length of the air intake pipes 214, 216 and 217 may create vibration and sound resonance that affects the fuel-to-air air ratio in the carburetor 152. Vibration and sound resonance adversely affect air pressure in the carburetor 152, thereby causing fuel-to-air to ratio to be either lean or rich, therefore adversely affecting performance of the engine.

The second main drawback to the related art intake system 200 is schematically illustrated in FIG. 4. In some circumstances, the ATV 100 is used in conditions where it is necessary to cross bodies of water, such as rivers and streams. It is for this reason that the inlet end 212 of the front end intake pipe 214 is positioned at the highest point of the ATV 100, near the steering column and just below the mounting plate 115, as discussed previously. However, when the ATV 100 is crossing a deep stream having a predetermined depth $D_{nominal}$, a wall of water or wave W having a depth $D_{max}$ greater than the predetermined depth $D_{nominal}$ is created and travels upwardly against the front of the ATV 100. This phenomenon can introduce water into the inlet end 212 of the front air intake pipe 214, which is undesirable. Typically, the wave W dissipates just rearward of the front wheels 102, and the depth $D_{wake}$ of the water behind the wave W is less than the predetermined depth $D_{nominal}$ of the water because of the wake created by the ATV 100.

Furthermore, both of the prior art intake systems 200 and 720 share an additional drawback in that the respective inlets 212, 722 are located just in front of the rider. With this arrangement, the rider is exposed to a substantial degree of noise and vibration emanating from the inlets 212, 722.

SUMMARY OF THE INVENTION

It is one aspect of the invention to avoid the main drawbacks of the related art, including positioning an air intake system relative to the engine such that air traveling through the air intake system is not exposed to relatively high temperatures prior to delivery to the engine.

It is another aspect of the invention to avoid other drawbacks of the related art, including providing an ATV with a short intake pipe that avoids sound resonance and vibration that can adversely affect the fuel-to-air ratio in the carburetor.

It is another aspect of the invention to provide an ATV in which the inlet end of air intake pipe is positioned to avoid interaction with a water wave created at the front of the vehicle when the vehicle travels through water.

It is yet another aspect of the present invention to provide an ATV in which existing ventilation openings on the ATV can he used to supply intake air to both the radiator and fan assembly and the air intake system.

It is yet another aspect of the present invention to provide an ATV in which the inlet end of the air intake pipe is positioned to prevent exposure of the rider to a substantial degree of noise and vibration emanating from the inlet end.

According to one preferred embodiment of the present invention, an all terrain vehicle having a frame and front and rear wheels suspended from the frame includes a pair of rear fenders attached to the frame, the rear fenders having at least one ventilation opening, an engine mounted on the frame between the pair of rear fenders, the engine providing motive power to at least one of the pair of front and rear wheels, and an air intake box connected to the frame and supplying intake air to the engine, the air intake box including an intake pipe connected to and receiving intake air from the at least one ventilation opening.

In embodiments, the vehicle may further comprise a radiator connected to the frame, the radiator drawing intake air from the at least one ventilation opening. In addition, the vehicle may comprise a seat located between the rear fenders, the intake pipe including an inlet end positioned adjacent a rear lateral portion of the seat. The inlet end of the intake pipe is preferably positioned above the rear wheels so as avoid interaction with a water wave created at the front of the vehicle when the vehicle travels through water.

According to another preferred embodiment of the present invention, an all terrain vehicle comprises an engine, a seat having a front portion positioned above the engine, an air intake system operatively connected to the engine, and at least one opening adjacent a rear portion of the seat and supplying intake air to the air intake system.

In embodiments, the vehicle further comprises rear fenders positioned adjacent the engine, wherein the at least one opening is located on at least one of the rear fenders. The air intake system may also include an air box having an intake pipe positioned so as to avoid interaction with a water wave created at the front of the vehicle when the vehicle travels through water. Also, the seat may be located between the rear fenders, and the air intake system may include an intake pipe having an inlet end positioned adjacent the rear portion of the seat.

According to another preferred embodiment of the invention, a straddle type motor vehicle having front and rear wheels and being capable of traversing water having a predetermined depth includes an engine, an air intake box positioned adjacent the engine and at least one opening in communication with the air intake box. The at least one opening is positioned on the vehicle rearward of the front wheels and so that the height of the opening is greater than the predetermined depth of the water. The position of the at least one opening also helps to avoid water entering the at least one opening due to encountering a water wave created in front of the vehicle that has a wave depth greater than the depth of the water.

The vehicle may also include a frame that mounts the engine, and rear fenders may be attached to the frame, with the at least one opening being provided within at least one of the rear fenders. The at least one opening may comprise at least one opening provided on each of the rear fenders, and a radiator may be connected to the frame, the radiator being in communication with the at least one opening. The air intake box may include an intake pipe having an inlet end adjacent to only one of the rear fenders. Also, the vehicle may further comprise a seat provided between the rear fenders, the air intake box including an intake pipe having an air inlet positioned adjacent a rear lateral portion of the seat.

According to still another preferred embodiment of the invention, an all terrain vehicle having front and rear wheels comprises a frame from which the wheels are suspended, an engine mounted on the frame, a fender structure overlying at least the rear wheels, the fender structure including at least one aperture, and an air intake system in communication with the engine, the air intake system including an air box mounted on the frame, the air intake box having an intake pipe having an inlet end, the intake pipe being fastened with respect to the fender structure such that the inlet end is in communication with the aperture in the fender structure and is positioned rearward of the front wheels and higher than the rear wheels.

In embodiments of an all-terrain vehicle, the aperture in the fender structure may be a ventilation opening that supplies intake air to a radiator positioned adjacent the engine. Also, the intake pipe may include a clip that attaches to the fender structure.

These and other aspects of preferred embodiments of the invention will be described in or apparent from the following detailed description of preferred embodiments.

BRIEF DESCRIPTION OF THE DRAWINGS

Preferred embodiments of the invention will be described in conjunction with the following drawings, wherein.

DETAILED DESCRIPTION OF PREFERRED EMBODIMENTS

Figure 5:
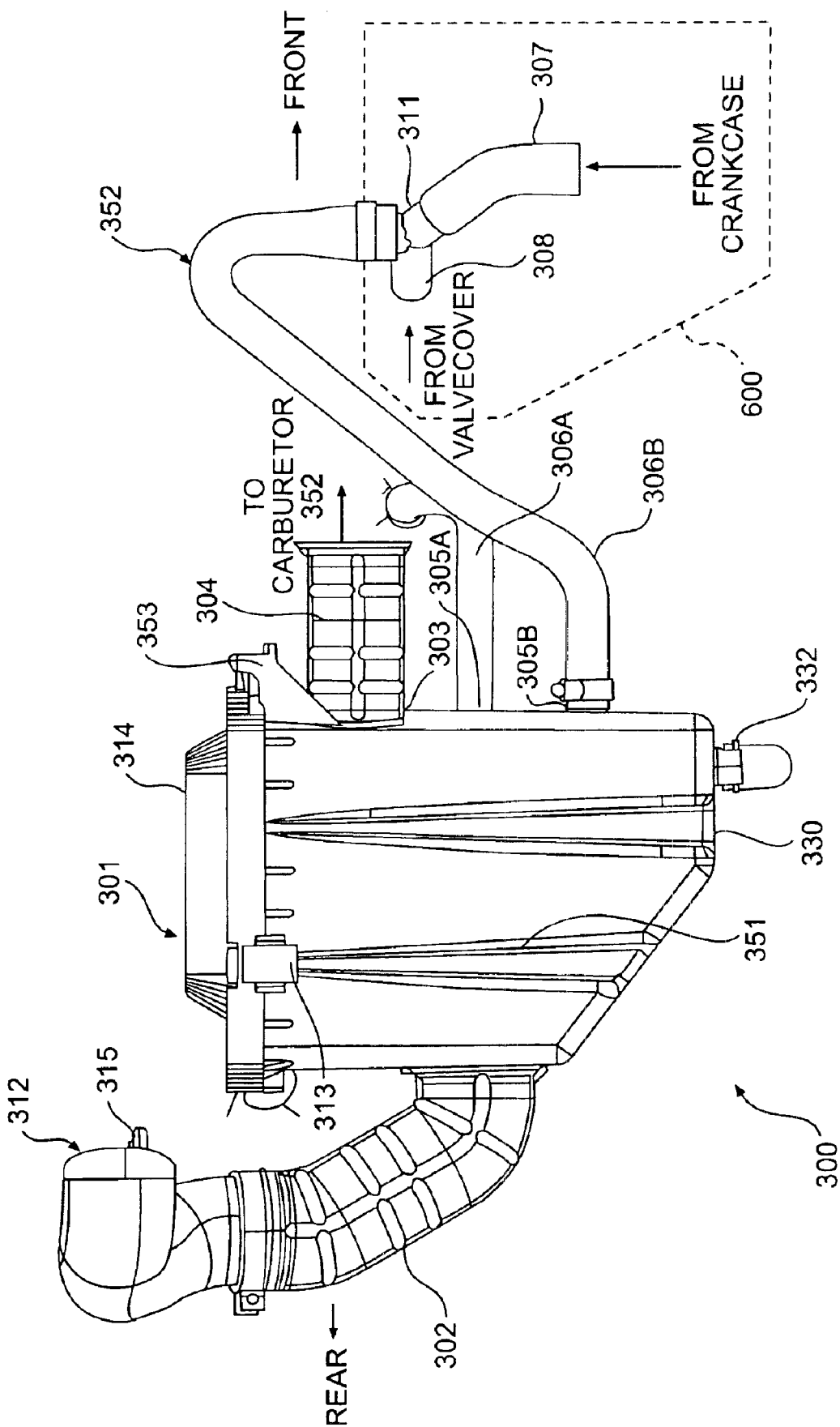
FIG. 5 is a side view illustrating an air intake system according to one preferred embodiment of the invention.
Figure 12:
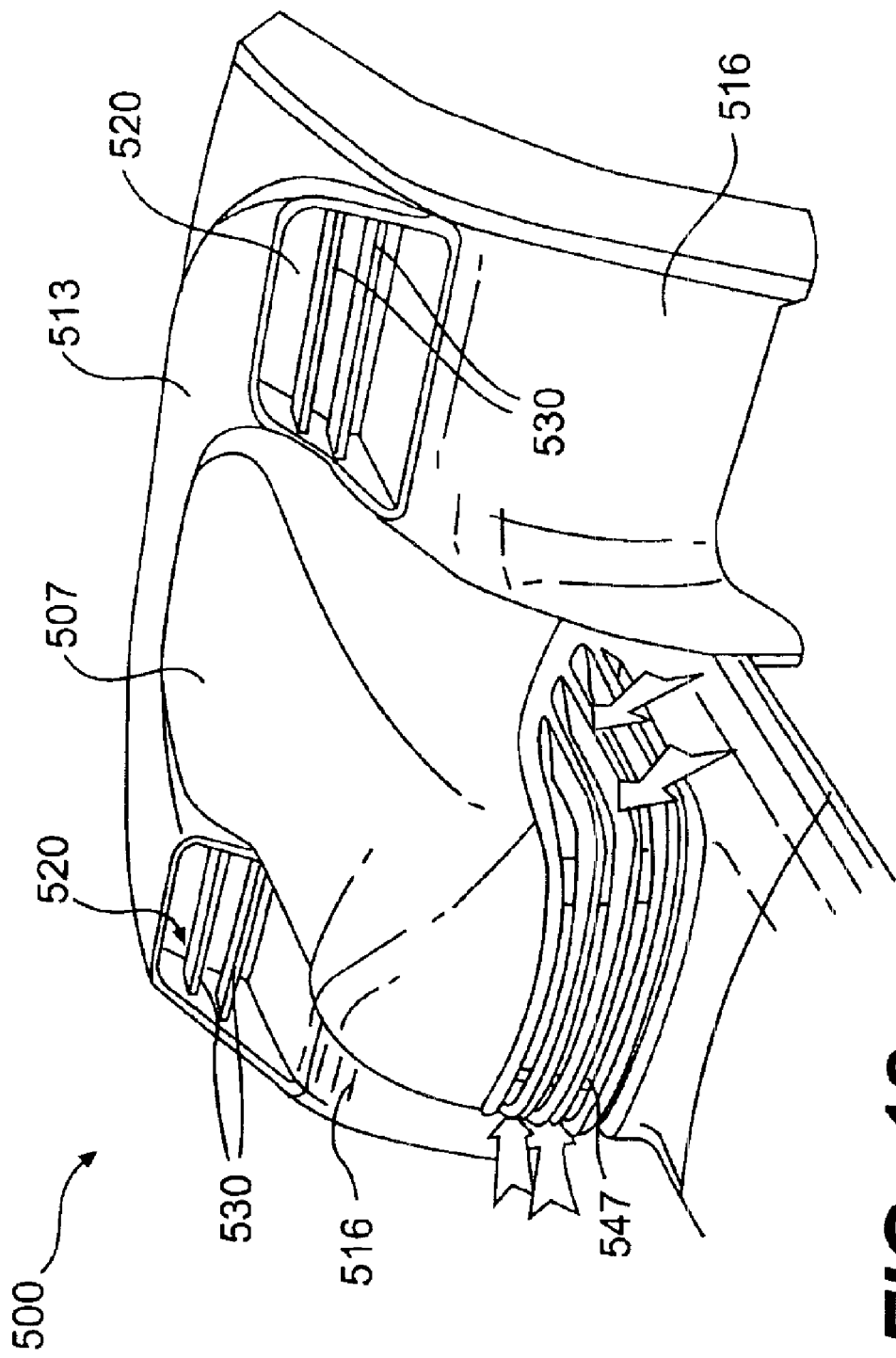
FIG. 12 is a front perspective view illustrating rear fenders with ventilation openings according to one preferred embodiment of the invention.

FIG. 5 illustrates an air intake system 300 according to one preferred embodiment of the invention. The air intake system 300 includes an air box 301, which is a closed container provided with a lid 314 that is secured to a main body 351 of the air box 301 using clips 313. The air box 301 is generally positioned beneath the seat 507 (FIG. 12) towards a rear portion of the ATV 500 (FIG. 12). It is contemplated that the specific construction and placement of the air box 301 may be altered from that shown and described herein.

Figure 6:
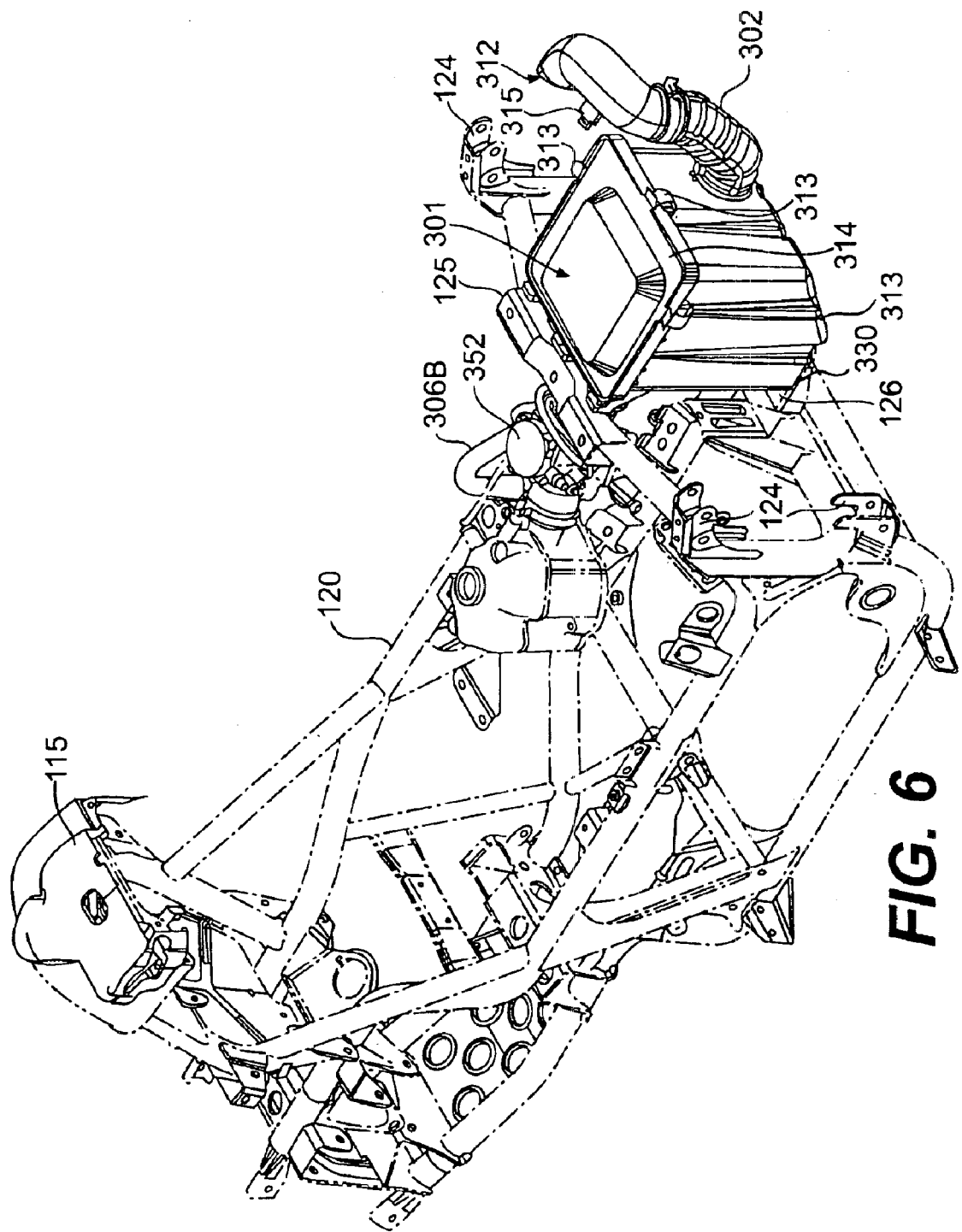
FIG. 6 is a rear perspective view of the air intake system of FIG. 5 attached to a frame according to one preferred embodiment of the invention.
Figure 7:
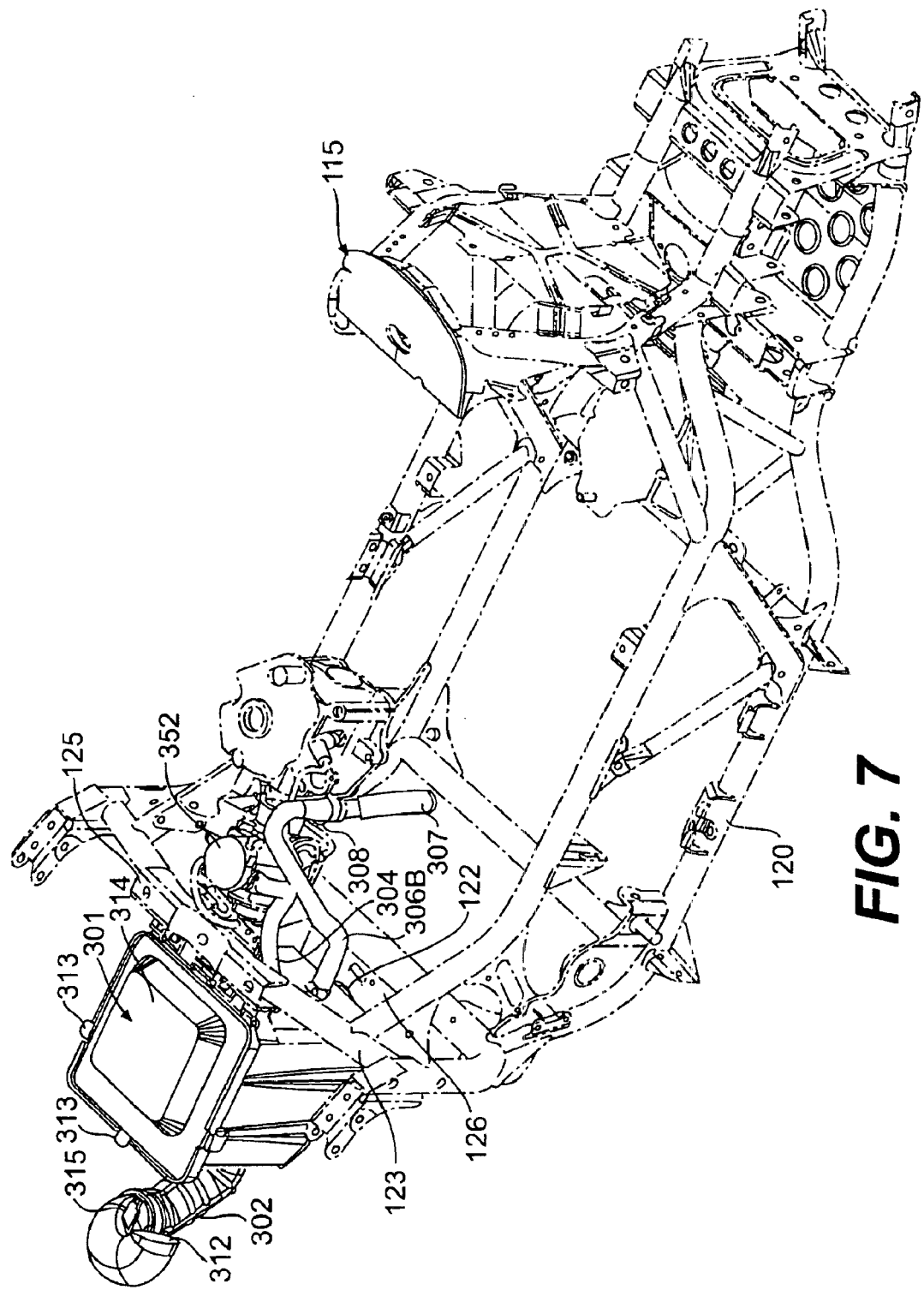
FIG. 7 is a front perspective view illustrating the air intake system and frame shown in FIG. 6.

The air intake system 300 includes an air intake pipe 302 connected to the main body 351 of the air box 301, toward the rear of the ATV 500. The air intake box 301 includes a port 303 that is connected to and provides intake air to an outlet pipe 304 that leads to a carburetor 352 (FIGS. 6 and 7). The air box 301 also includes ports 305A and 305B, which are connected to vacuum pipe 306A and engine ventilation pipe 306B, respectively. The vacuum pipe 306A is connected to the carburetor 352 and applies vacuum pressure from the carburetor 352 (generated by the engine 600) on a valve element (not shown) situated within the air box 301. It is contemplated that the valve element may be used to control the quantity of intake air allowed to enter the outlet pipe 304 from the air box 301. The engine ventilation pipe 306B serves to vent components of engine 600 such as a crankcase and valve cover through respective ventilation pipes 307, 308. As shown in FIG. 5, engine ventilation pipe 306B includes a "Y" fitting 311 to connect both the crankcase and valve cover of the engine 600 via pipes 307, 308, respectively to the engine ventilation pipe 306B. There are, of course, different configurations possible for the input to and output from the air box 301 dependent upon the particular design of the engine 600.

The air box 301 includes an extension 353 provided on a portion of the air box 301 facing the front of the ATV 500. The extension 353 is used to attach the air box 301 to the frame 120 (FIGS. 6 and 7), and the air box 301 also includes a bottom wall 330 that includes a pin 332 for engaging an aperture provided on the frame 120, as described below.

Figure 2A:
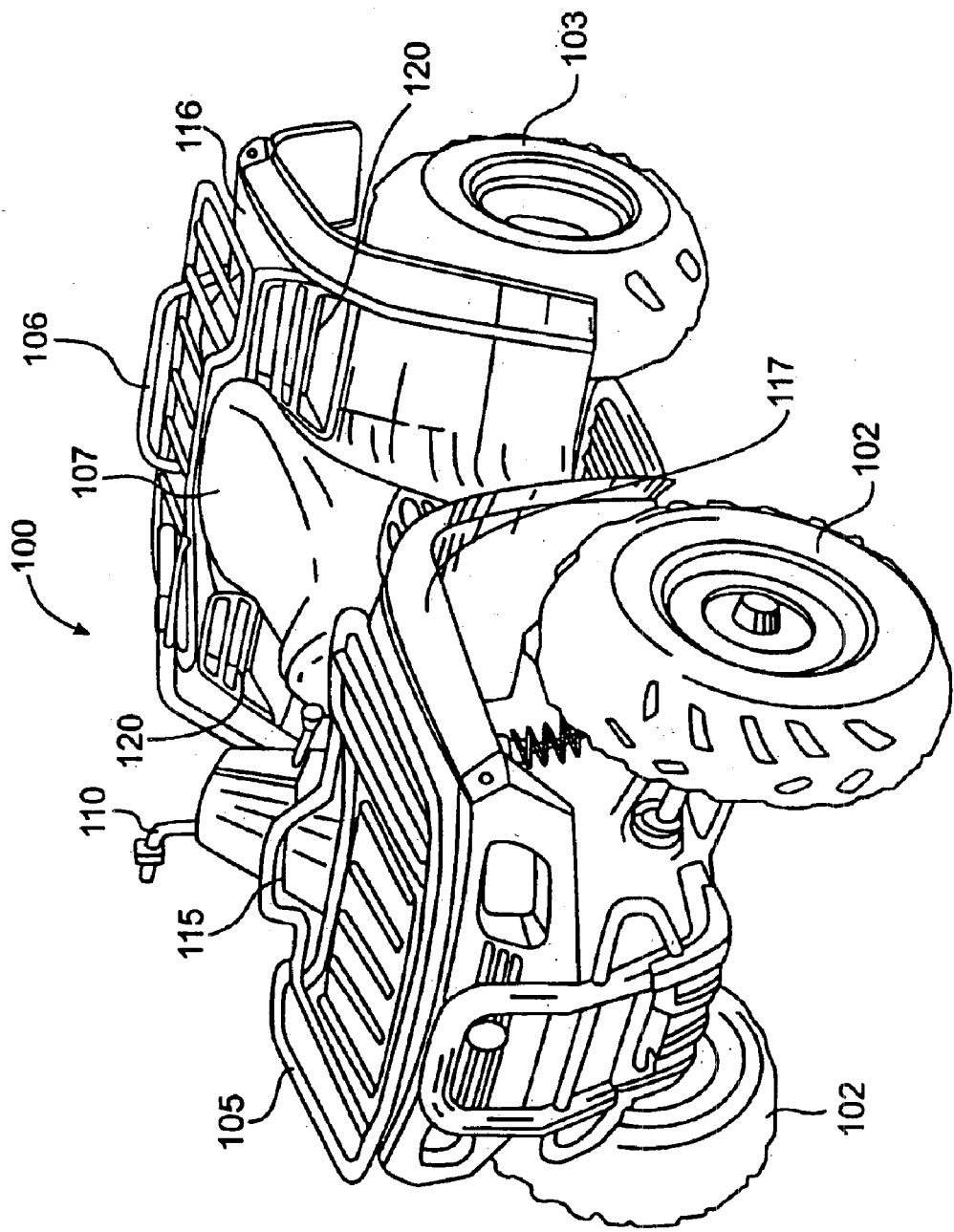
FIG. 2A is a perspective view illustrating another related art ATV.
Figure 2B:
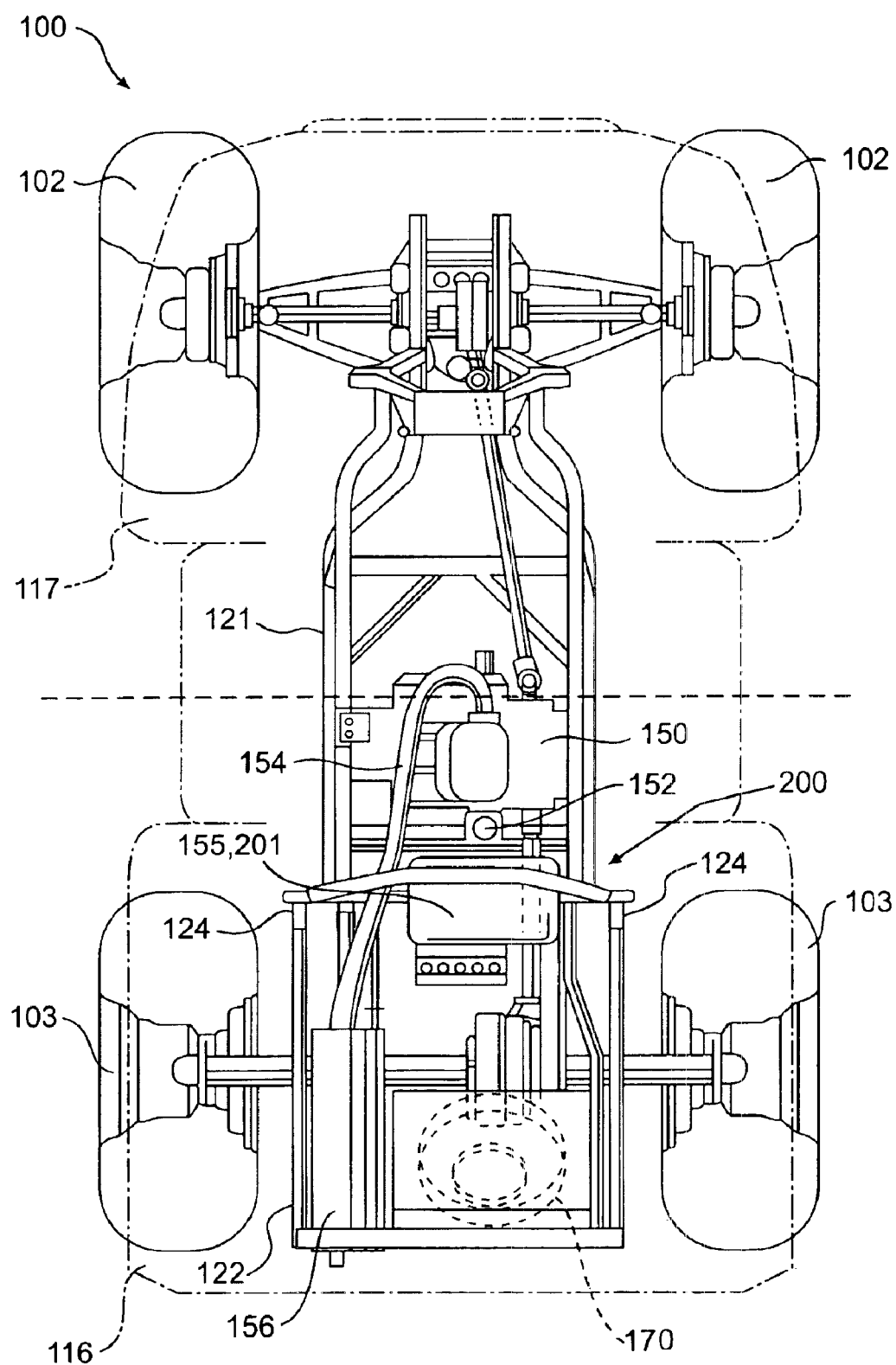
FIG. 2B is a plan view of a frame of the related art ATV shown in FIG. 2A.

FIGS. 6 and 7 are rear and front perspective views, respectively, illustrating one preferred embodiment for attaching the air box 301 to the frame 120. The frame 120 may have a subframe similar to that shown in FIG. 2B. Additionally, the frame 120 may include other members.

Figure 3:
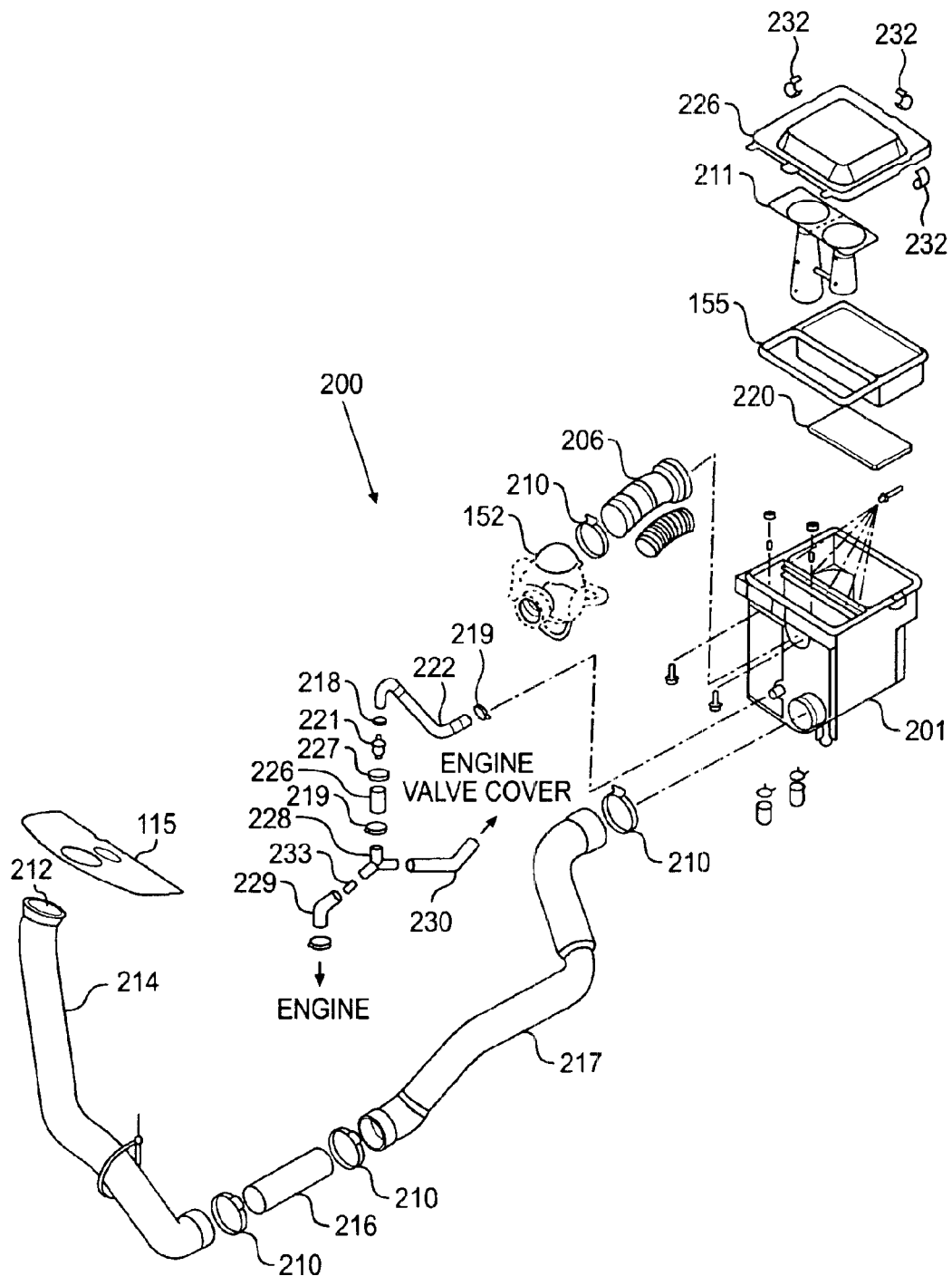
FIG. 3 illustrates an air intake system of the related art ATV shown in FIGS. 2A and 2B.
Figure 4:
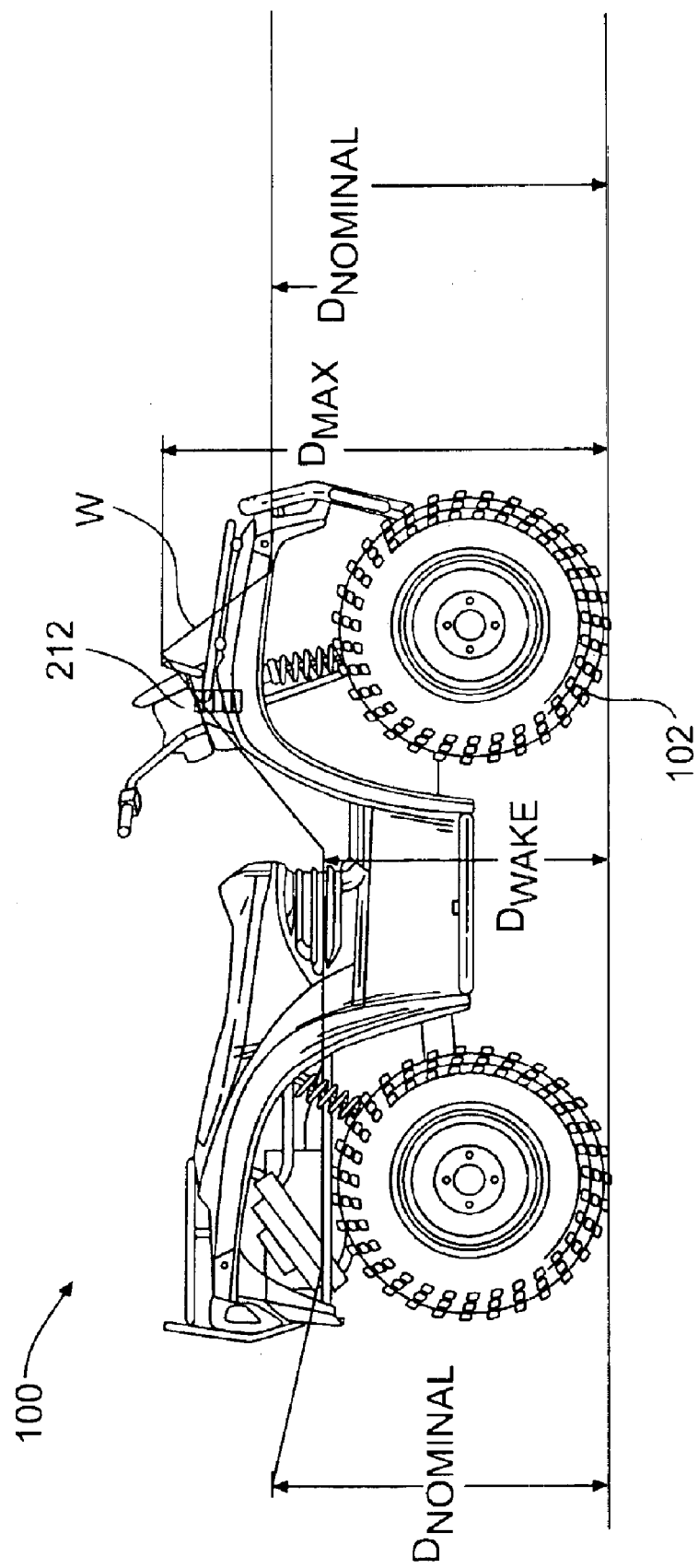
FIG. 4 is a schematic view of the related art ATV shown in FIGS. 2A and 2B as it travels through water.

As compared to the arrangement shown in FIG. 3 in which the inlet end 212 of the intake pipe 214 is provided beneath the mounting plate 115, the inlet end 312 of the intake pipe 302 is provided close to the air box 301 and towards the rear of the vehicle. One important advantage to this arrangement is that the length of the intake pipe 302 is significantly reduced as compared to the combined length of the intake pipes 214, 216 and 217 shown in FIG. 3. As such, the intake pipe 302 is much less apt to vibration, thereby helping to avoid or avoiding sound resonance that can adversely affect the fuel-to-air ratio in the carburetor 352. Thus, the fuel-to-air ratio in the air intake system 300 can be more precisely controlled to provide for better engine operating performance. Further the air intake system 300 has less parts and is also easier to assemble and maintain, thereby reducing costs for maintenance, labor and parts.

As shown in FIG. 6, the frame 120 also includes a support plate 126 for supporting the bottom wall 330 of the air box 301. As shown in FIG. 7, the support plate 126 includes an aperture 122 for receiving the pin 332 of the air box 301.

Figure 8:
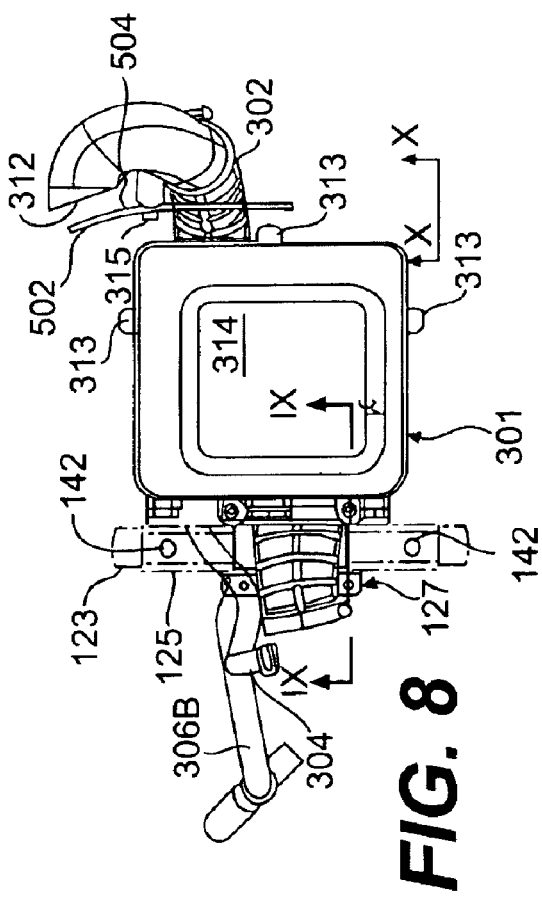
FIG. 8 is a top view of the air intake system of FIG. 5 illustrating one embodiment of the manner in which the air intake box is connected to both the frame and fender structure.
Figure 9:
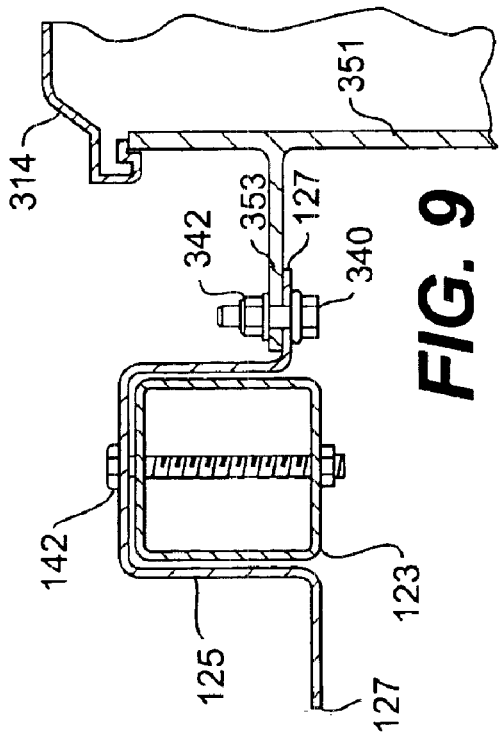
FIG. 9 is an enlarged cross-sectional view along line IX—IX of FIG. 8.

FIG. 8 is a top plan view illustrating one preferred connection arrangement between the air intake system 300 and the frame 120. FIG. 8 also illustrates one preferred arrangement for connecting the air intake system 300 to a connecting wall 502 that is positioned between and preferably formed integrally with the fender structure, e.g., rear fenders 516 (FIG. 12). Referring back to FIG. 6, the frame 120 includes a frame adapter member 125 connected to the frame 120 using, for example, a standard nut and bolt assembly 142 (FIG. 8), or other suitable fastener. The adapter member 125 includes a lateral extension 127 on each side of a main support bar 123 of the frame 120. The lateral extension towards the air box 301 includes a bolt hole through which a bolt 340 (FIG. 9) extends to secure the air box 301 to the adapter member 125 of the frame 120. As shown in FIG. 9, which is an enlarged cross-sectional view along line IX—IX of FIG. 8, the extension 353 of the air box 301 and one of the lateral extensions 127 of the frame 120 (on the side of the main support bar 123 facing the air box 301) are bolted together using the bolt 340 and nut 342.

Figure 10:
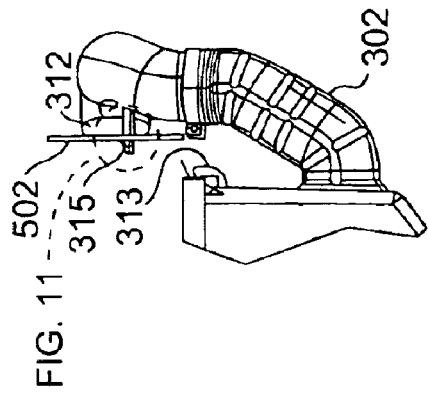
FIG. 10 is a cross-sectional view along line X—X of FIG. 8.
Figure 11:
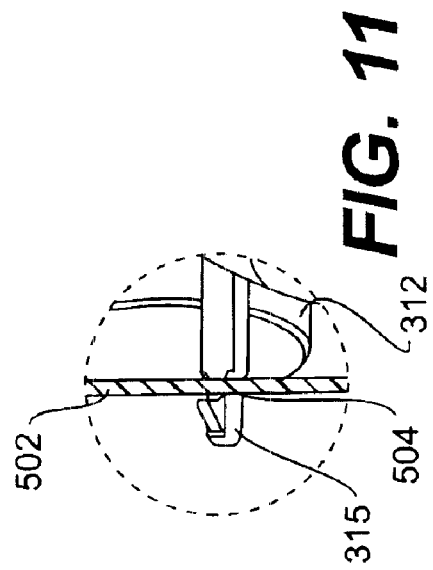
FIG. 11 is a detail view of a portion of FIG. 10.
Figure 13:
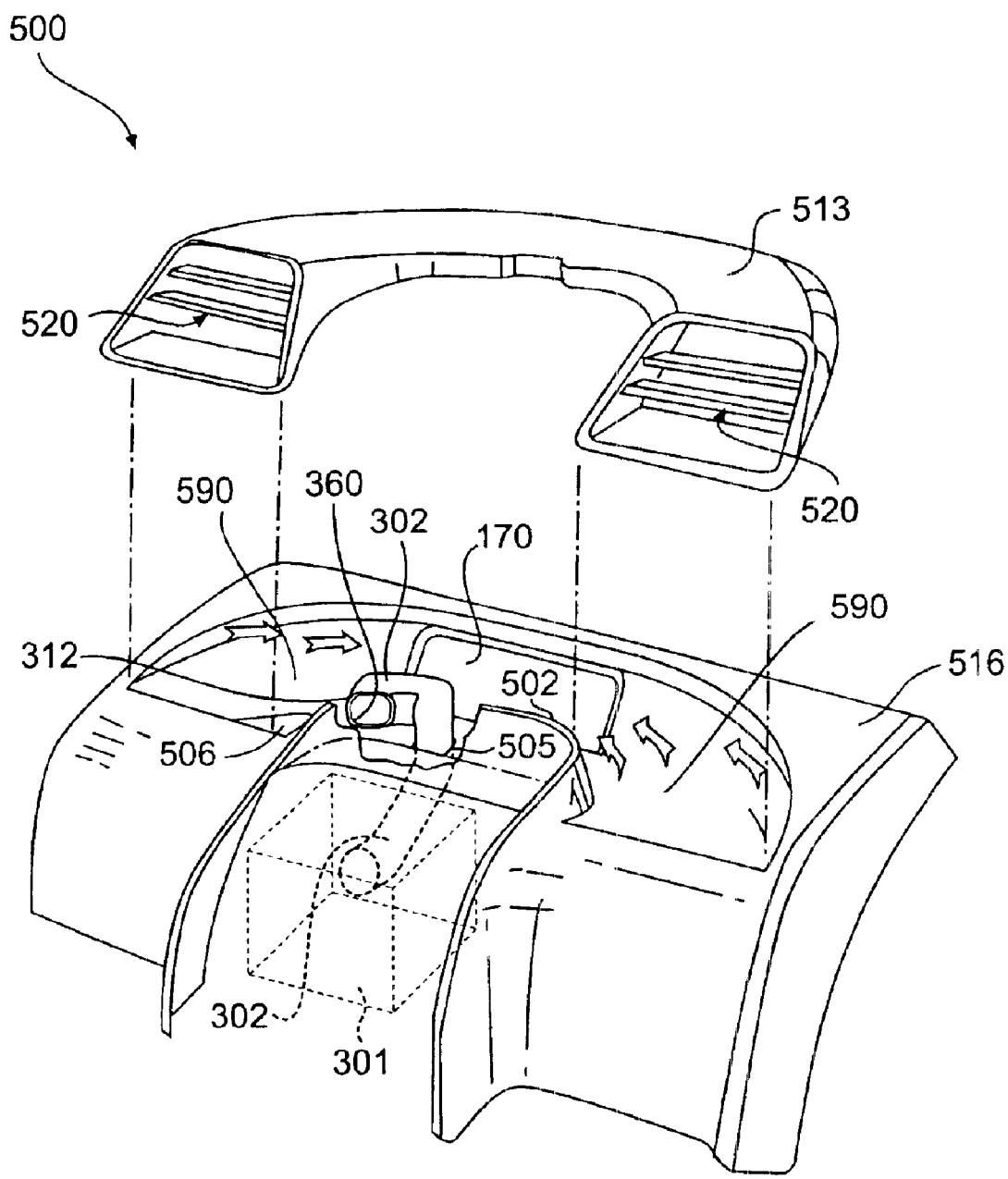
FIG. 13 is a front perspective view according to one embodiment of the invention illustrating the cover portion and the rear fenders in a disassembled state without the seat.
Figure 13A:
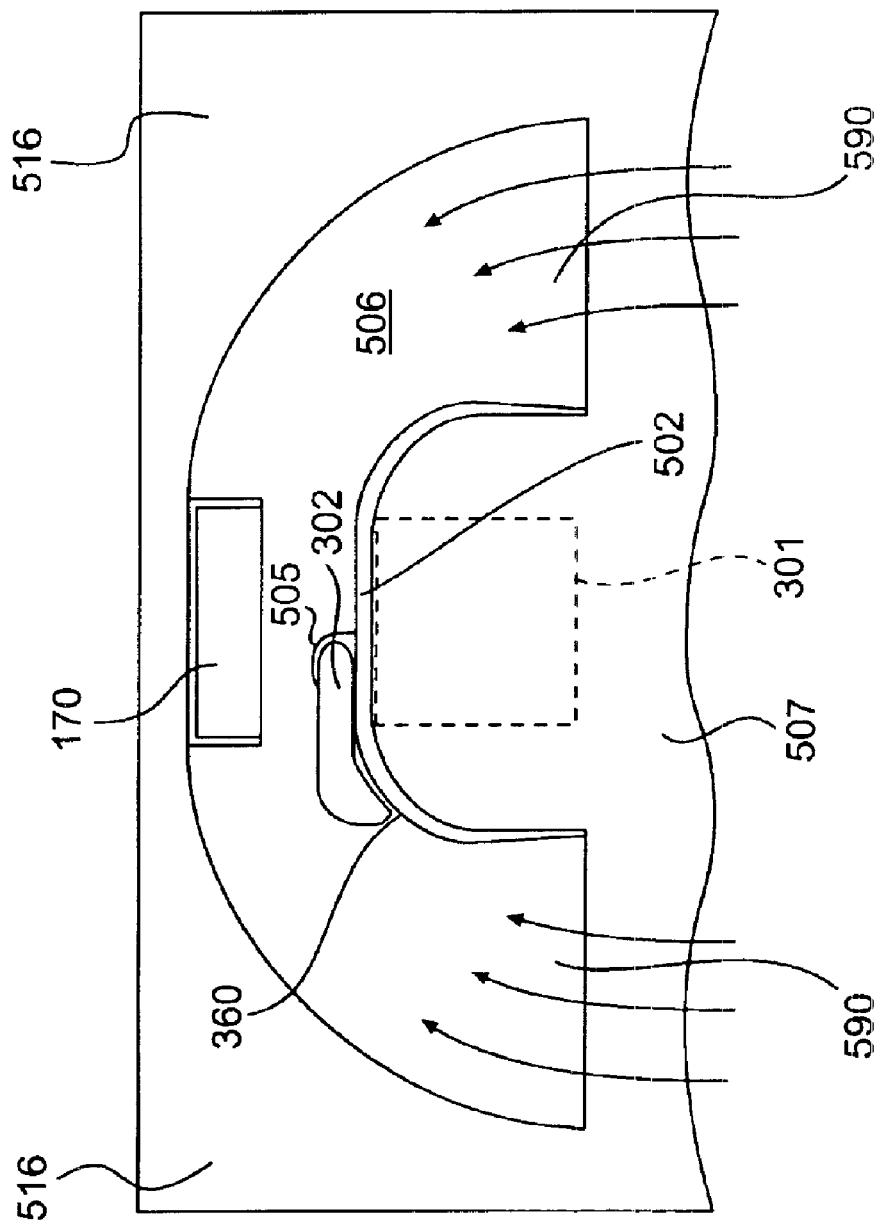
FIG. 13A is a top view of the cover portion and rear fenders shown in FIG. 12.

As shown in FIGS. 8, 10, 13 and 13A, the air intake pipe 302 extends beneath the connecting wall 502 and extends upwardly through a bottom wall 506 defined by one of a plurality of channels 590 (FIG. 13) that are preferably formed as part of the fender structure. Referring to FIG. 13A, the bottom wall 506 may be provided with a U-shaped aperture 505, through which the intake pipe 302 extends. Alternatively, or in addition, the intake pipe 302 can be guided through an aperture (not shown) formed in a side wall of the connecting wall 502, rather than in the bottom wall 506 of, one of the channels 590. As shown in FIGS. 8 and 11, the connecting wall 502 also includes a slot 504 for receiving a fastener formed as part of the intake pipe 302. For example, a clip 315 made of a resilient material and integrally formed with or connected to the intake pipe 302 can be provided to fasten the intake pipe 302 to the connecting wall 502. The detail view of FIG. 11 shows that the clip 315 extends through the connecting wall 502 to secure the intake pipe 302 with respect to the connecting wall 502 such that the inlet end 312 of the intake pipe 302 is fastened in a predetermined position with respect to an aperture or a ventilation opening 520 (FIG. 13) on the fender structure, e.g., the rear fenders 516 of the ATV, as described below.

Figure 1A:
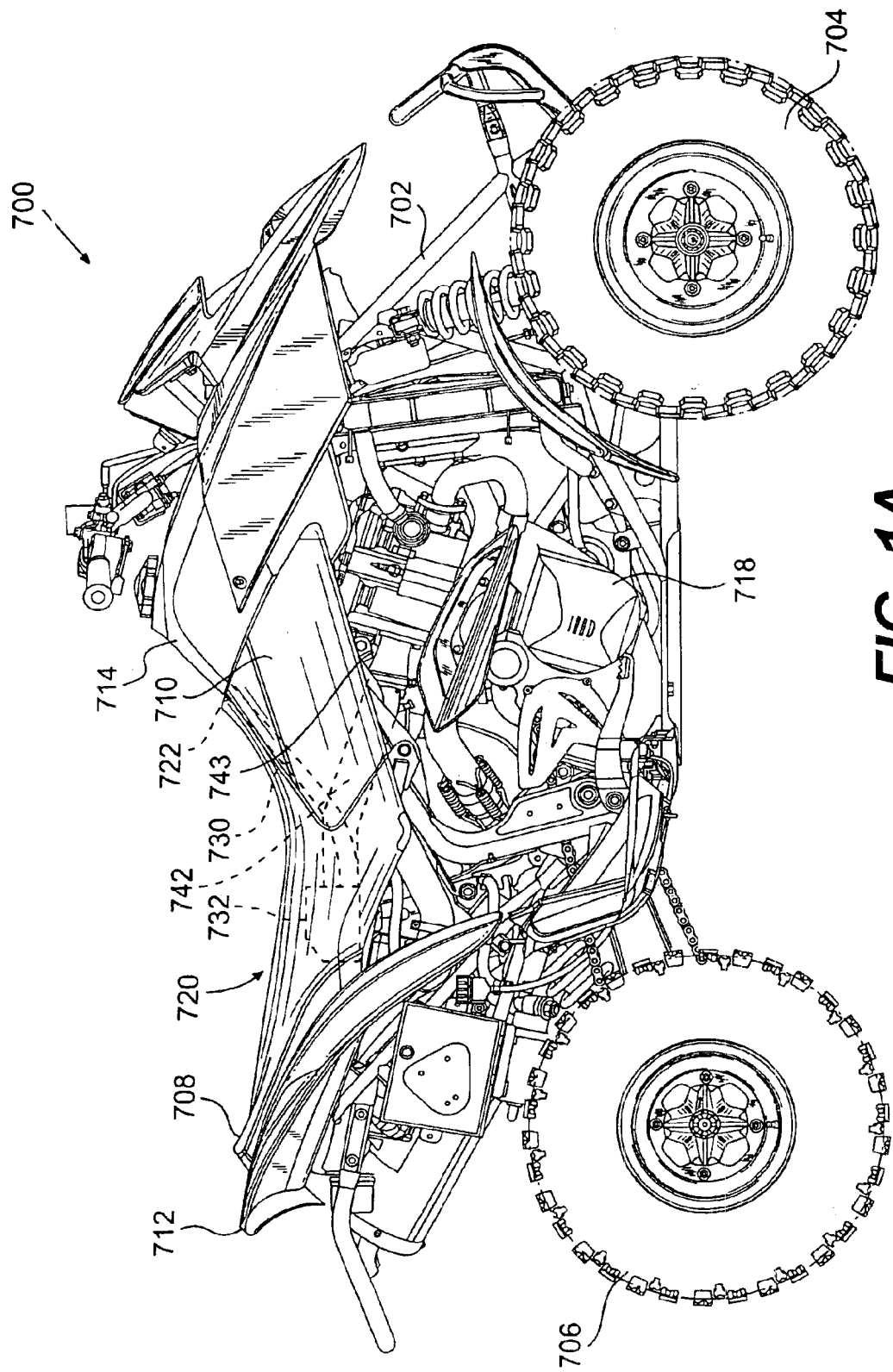
FIG. 1A is a perspective view illustrating a related art ATV.
Figure 1B:
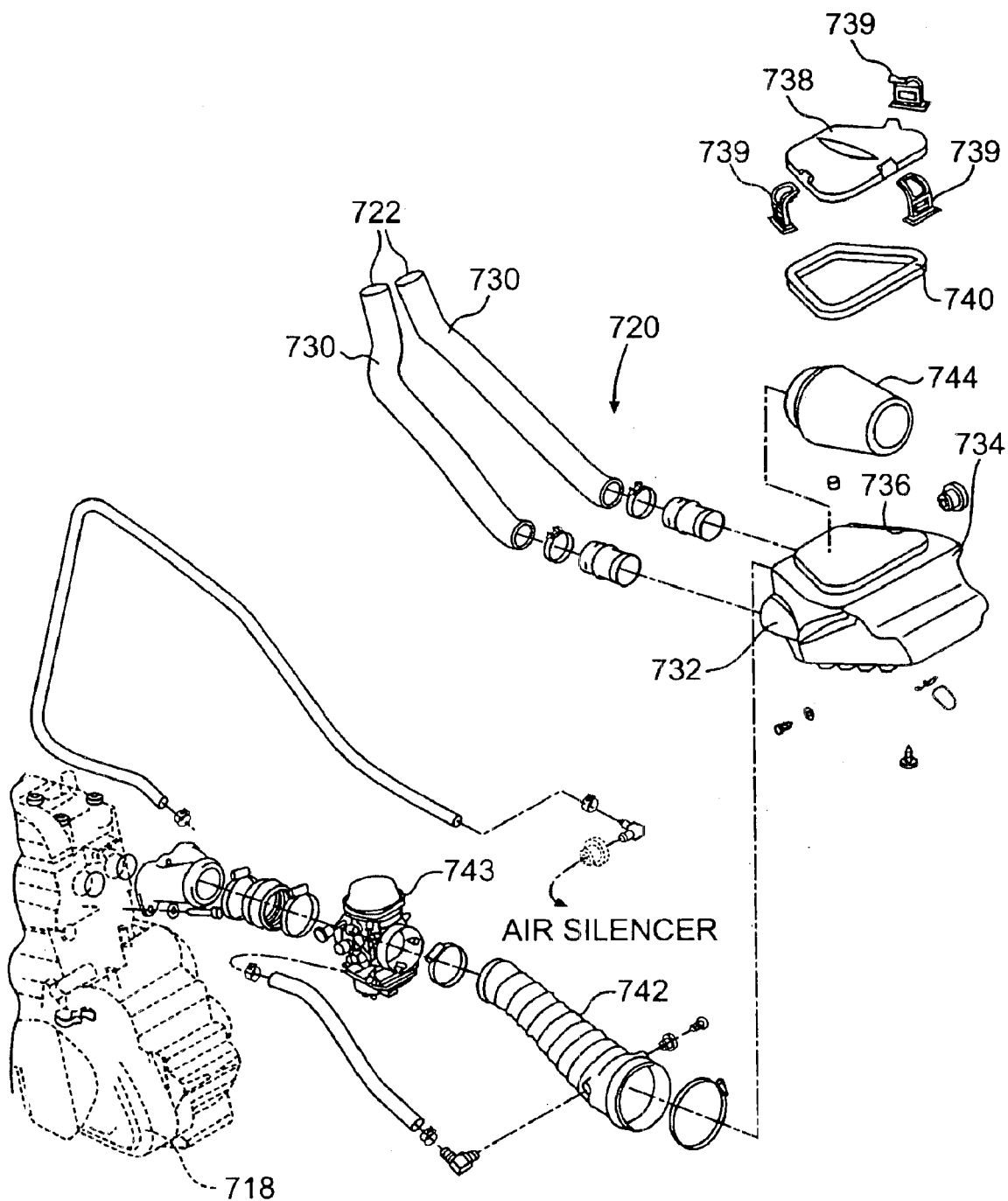
FIG. 1B illustrates an air intake system of the related art ATV shown in FIG. 1A.

Like the ATV 100 shown in FIG. 1, the ATV 500 according to the invention has fender structure that includes rear fenders 516 on either side of a seat 507, as shown in FIGS. 12 and 13. The rear fenders 516 include apertures or ventilation openings 520. Also, since the power unit (engine) is positioned at least in part beneath the seat 507, additional ventilation openings 547 are preferably provided in the base portion of the seat 507 in order to ensure proper ventilation of the engine compartment. The ventilation openings 547 preferably extend to the side of the seat 507 since accessories, which could block the openings, may be provided in front of the base portion of the seat 507. FIG. 12 also shows protection grills 530 that are connected to a cover portion 513. The protection grills 530 prevent large objects from entering into the channels 590 (FIG. 13) that lead to the radiator and fan assembly 170, which are more fully described in U.S. Pat. No. 6,296,073 and A allowed pending application Ser. No. 09/057,652.

FIG. 13 schematically shows the position of the airbox 301 next to the connecting wall 502 between the rear fenders 516. The intake pipe 302 of the air box 301 is guided beneath the connecting wall 502 and through a bottom wall 506 of the channels 590 (via aperture 505) so that the inlet end 312 has access to intake air that enters at least one of the ventilation openings 520. The slot 504 for receiving the clip 315 that is integrally formed with or connected to the intake pipe 302 is also shown. As shown in FIGS. 10 and 11, the slot 504 is positioned such that the inlet end 312 of the intake pipe 302 is positioned to receive intake air through at least one of the ventilation openings 520. As such, the ventilation openings 520 provide intake air to both the radiator and fan assembly 170 as well as the intake air system 300. As shown in FIG. 13, The inlet end 312 of the intake pipe 302 is positioned adjacent a rear lateral portion of the seat 507. In this position, the inlet end of the intake pipe 302 is positioned rearward of the front wheels 102, and preferably above one of the rear wheels 103. As also shown, the inlet end 312 of the intake pipe 302 curves to the right side of the ATV, toward a right one of the rear fenders 516. In this manner, in the illustrated preferred embodiment, the air intake pipe 302 draws air from substantially only one of the ventilation openings 520, which is on the right side of the ATV, as shown in FIG. 13.

It is also contemplated that the intake pipe 302 may curve to the left, so as to draw air substantially from the left side of the ATV, or may be disposed proximate the center of the ATV, between the rear fenders 516, so as to draw air from both ventilation openings 520. Furthermore, the intake pipe 302 may be configured such that an intake opening 360 provided by the intake pipe 302 is arranged in a generally forwardly facing direction so as to confront connecting wall 502. In this manner, there is a decreased likelihood that foreign objects or water may enter the intake opening 360.

Alternatively, the intake pipe 302 may be configured such that the intake opening 360 faces toward a rear of the ATV, or laterally toward the center of the ATV. Obviously, foreign objects and water are substantially prevented from entering the intake opening 360 in any of these arrangements due to the orientation of the intake opening 360 relative to the direction of air flow (and perhaps water flow, if water enters the openings 520) through the channels 590 toward the radiator and fan assembly 170.

Figure 13B:
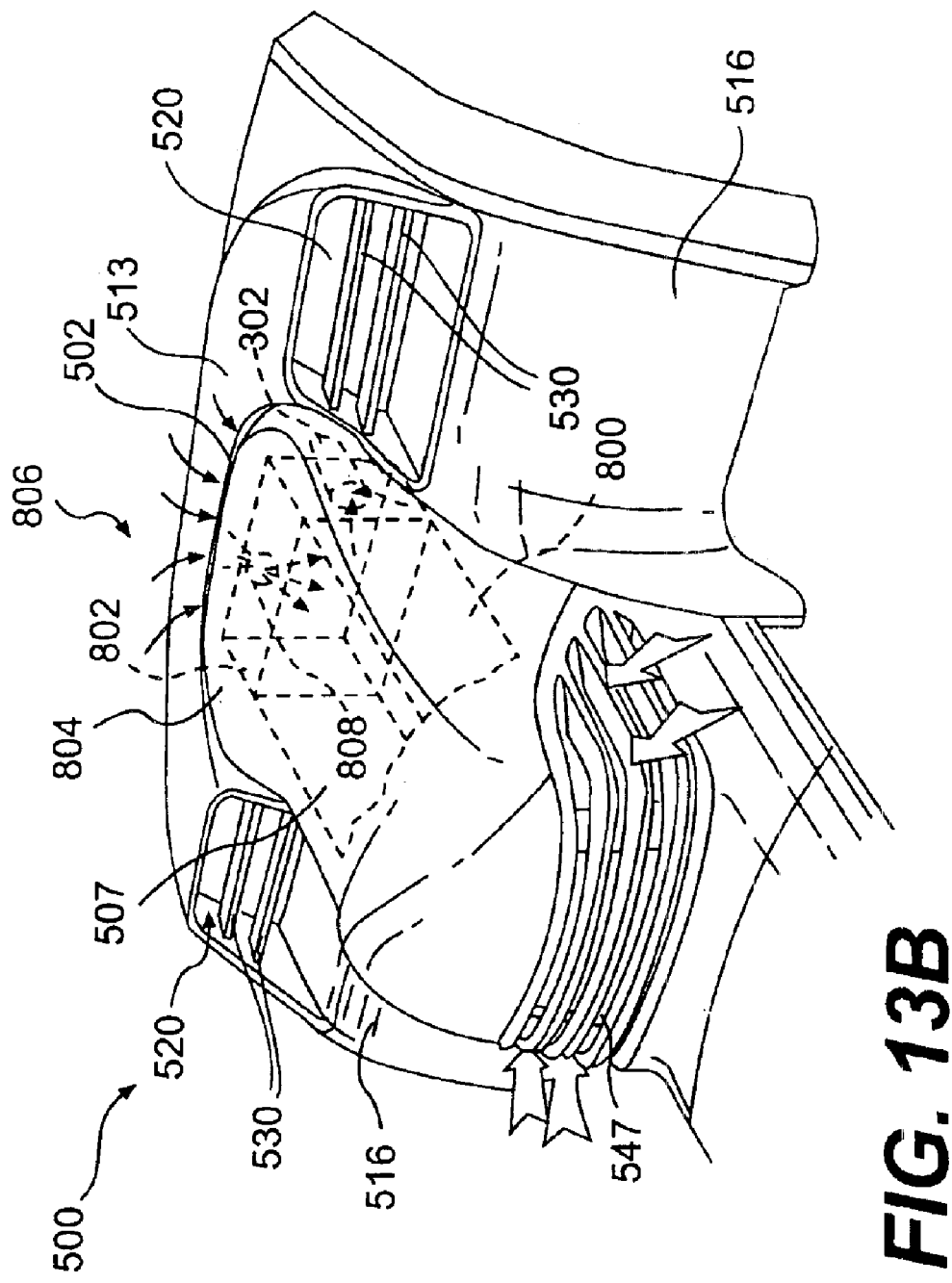
FIG. 13B is a front perspective view illustrating anther preferred embodiment of the invention.

Another contemplated embodiment is shown in FIG. 13B. As shown, the seat 507 includes a seat frame 800. The seat frame 800 serves to provide rigidity to the seat 507 and allow padding materials to be mounted thereto. Additionally, the seat frame 800 may form a hollow enclosure 802 at a rear portion 804 of the seat 507. As also shown, the intake pipe 302 connects to the enclosure 802. It is contemplated that an air intake opening, indicated at 806, may be formed, for example, within the seat 507 itself or between the rear portion 804 of the seat 507 and the connecting wall 502. In this manner, air may pass through the intake opening 806, through an aperture 808 in the enclosure 802, and to the intake pipe 302.

The enclosure 802 may serve to facilitate the attenuation of noise and vibration emitted by the intake pipe 302. It is also contemplated that attenuation features, such as ribs, may be formed on an interior of the enclosure 802 to further attenuate noise and vibration.

Furthermore, it is contemplated that the enclosure 802 may be used either in lieu of or in addition to the air box 301.

Figure 14:
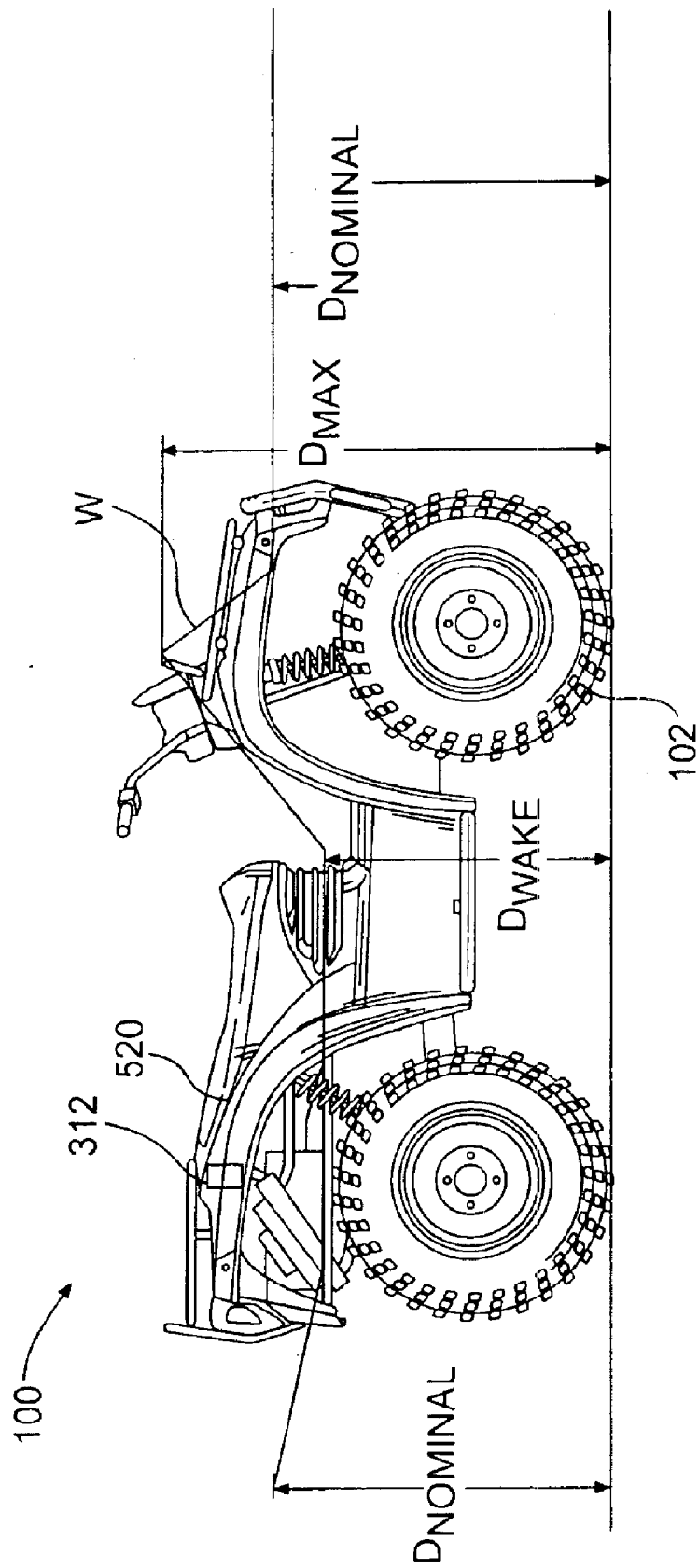
FIG. 14 is a schematic view illustrating one advantage of the placement of the inlet end of the air intake pipe when the vehicle travels through water, according to one preferred embodiment of the invention.

FIG. 14 is a schematic diagram illustrating one advantage to the arrangement shown in the preferred embodiments illustrated herein. In FIG. 14, the ventilation openings 520 and/or the inlet end 312 of the intake pipe 302 are/is positioned at a height that is greater than the depth $D_{wake}$ of the wave and is preferably greater than the predetermined depth $D_{nominal}$ of the water. In addition, the inlet end 312 is positioned on the vehicle so as to avoid entry of water due to encountering a water wave W at the front of the ATV 500, wherein the water wave W has a depth $D_{max}$ greater than the predetermined depth $D_{nominal}$. Moreover, positioning of the inlet end 312 of the intake pipe 302 as indicated in FIG. 14 takes advantage of the fact that the depth $D_{wake}$ of the water behind the wave W is less than the depth of the water $D_{nominal}$ in front of the wave W due to the wake created by the ATV 500.

While preferred embodiments of the invention have been shown and described, it is evident that variations and modifications are possible that are within the spirit and scope of the preferred embodiments described herein.

What is claimed is:

1. A straddle-type vehicle comprising;

a frame;

two front wheels supporting the frame;

two rear wheels supporting the frame;

an engine having a combustion chamber;

a seat supported by the frame having a front portion positioned generally above the engine;

an air intake system channeling air to the combustion chamber of the engine;

at least one opening adjacent a rear portion of the seat and supplying intake air to the air intake system; and a pair of rear fenders provided adjacent the rear portion of the seat, each rear fender having a front portion, the at least one opening being located on the front portion of at least one of the rear fenders and entirely above a horizontal plane containing the uppermost portion of the rear wheels.

2. The straddle-type vehicle according to claim 1, wherein the at least one opening is a ventilation opening supplying air to both the air intake system and a radiator of the vehicle.

3. The straddle-type vehicle according to claim 1, wherein the seat is located between the rear fenders, the air intake system including an intake pipe having an inlet end positioned adjacent a rear lateral portion of the seat.

4. The straddle-type vehicle according to claim 1, wherein the at least one opening includes a pair of openings, the pair of openings being located on respective rear fenders, such that the rear portion of the seat is disposed between the pair of openings.

5. The straddle-type vehicle according to claim 1, wherein the at least one opening is located on a respective rear fender generally rearward of the rearward portion of the seat.

6. The straddle-type vehicle according to claim 1, wherein the at least one opening Is not located directly vertically over the engine.

7. The straddle-type vehicle according to claim 1, wherein the air intake system includes an intake pipe positioned so as to avoid interaction with a water wave created in a front portion of the vehicle when the vehicle travels through water.

8. The straddle-type vehicle according to claim 1, wherein the air intake system includes an air intake pipe, wherein an end of the air intake pipe extends within the seat.

9. The straddle-type vehicle according to claim 8, wherein the rear portion of the seat forms a hollow enclosure, an interior of the hollow enclosure being communicated with an end of the air intake pipe and the opening.

10. A straddle-type motor vehicle having front and rear wheels and being capable of traversing water having a predetermined depth, the vehicle comprising:

an engine;

a frame that mounts the engine;

an air intake box positioned adjacent the engine;

at least one opening in communication with the air intake box; and rear fenders attached to the frame, the at least one opening being provided on at least one of the rear fenders, the at least one opening being positioned on the vehicle rearward of and above the front wheels and so that a height of the opening is greater than the predetermined depth of the water, the at least one opening being positioned on the vehicle so as to avoid water entering the at least one opening due to encountering a water wave created in front of the vehicle that has a wave depth greater than the predetermined depth of the water, wherein the air intake box includes an intake pipe having an inlet end adjacent to only one of the rear fenders.

* * * * *